(12) United States Patent
Scorteanu

(10) Patent No.: US 7,313,975 B1
(45) Date of Patent: Jan. 1, 2008

(54) APPARATUS AND METHOD FOR MEASURING TENSION IN GUY WIRES

(76) Inventor: Romel Scorteanu, 48 L'Oree du Bois, Verdun, Quebec (CA) H3E 2A3

( * ) Notice: Subject to any disclaimer, the term of this patent is extended or adjusted under 35 U.S.C. 154(b) by 110 days.

(21) Appl. No.: 11/353,727

(22) Filed: Feb. 13, 2006

(51) Int. Cl.
*G01L 5/04* (2006.01)

(52) U.S. Cl. ............... 73/862.454; 73/862.42; 73/862.451; 73/862.452; 73/862.453; 73/862.581; 254/257

(58) Field of Classification Search ............ 73/862.42, 73/862.451–454, 862.581; 254/257
See application file for complete search history.

(56) References Cited

U.S. PATENT DOCUMENTS

| | | | | |
|---|---|---|---|---|
| 2,328,364 A | * | 8/1943 | Taylor ............... | 73/862.42 |
| 2,376,037 A | | 5/1945 | Davies et al. | |
| 2,590,498 A | * | 3/1952 | Bomberger ......... | 73/862.393 |
| 3,372,582 A | * | 3/1968 | Weiss et al. ........ | 73/862.451 |
| 4,423,639 A | | 1/1984 | Grade et al. | |
| 4,534,228 A | | 8/1985 | Burbank, Jr. | |
| 4,628,747 A | * | 12/1986 | Weitz et al. ........ | 73/862.44 |
| 5,038,622 A | * | 8/1991 | Tijmann ............ | 73/862.393 |
| 5,877,434 A | * | 3/1999 | Sturm ............... | 73/862.474 |
| 6,880,412 B1 | * | 4/2005 | Gupta ............... | 73/862.391 |

* cited by examiner

*Primary Examiner*—Edward Lefkowitz
*Assistant Examiner*—Freddie Kirkland, III
(74) *Attorney, Agent, or Firm*—Kenneth A. Roddy

(57) ABSTRACT

An apparatus for measuring tension in guy wire systems wherein the lower end of the guy wire has a thimble adjoined by a connection pin to a yoke or clevis of a turnbuckle shackle bolt connected to an earth anchor. A block assembly is removably received beneath the clevis and a thimble-engaging jaw assembly is removably received on the guy wire above the clevis. The block assembly and jaw assembly are connected at one end by a threaded rod assembly that includes a strain sensor connected with an indicator device, and by a threaded rod at their opposed end. The jaw assembly is drawn downward by adjusting nuts on the threaded rods beneath the block assembly to engage the thimble and move it downward transferring the tension to the threaded rod and threaded rod assembly which is sensed by the strain sensor and indicated by the indicator device.

16 Claims, 6 Drawing Sheets

APPARATUS AND METHOD FOR MEASURING TENSION IN GUY WIRES

BACKGROUND OF THE INVENTION

1. Field of the Invention

This invention relates generally to tension measuring apparatus and methods, and more particularly to an apparatus and method for measuring tension in guy wires.

2. Background Art

Tall towers, such as radio and television broadcasting towers, microwave towers, etc., may be erected as self-supporting or guyed. The guyed towers are supported by cables running from the tower to the ground called "guy" wires. These guy wires are typically disposed on all three sides of a tower at 120° and hold the tower structure in a vertical position. They also absorb the forces of winds, ice deposits, etc., on the tower. When a tower is designed it is designed as a unit, including the guy wires and the tension in them. The tension in the guy wires can change over time due to the guy elongation created by its own stabilization or equilibrium, shifting ground conditions, damage and/or various temperature and severe weather conditions. It is important that the tension in the wires be kept close to the design value, since a tension greater or lower than designed could allow the tower to bend and perhaps fail under high winds. Uneven tension in the guy wires can distort the tower and make it susceptible to wind damage. Uneven tension can also allow the tower to turn such that the microwave antenna installed on its structure becomes misaligned from the proper alignment with the adjacent microwave antenna from the next tower.

There are two basic methods for measuring guy wire tension in the field; the direct method, and the indirect method. There are two common techniques for the indirect method of measuring guy wire tension; the pulse or swing (vibration) technique, and the tangent intercept or sag technique.

In the direct method, a dynamometer (load cell) with a length adjustment device, such as a come-along, is attached to the guy wire just above the turnbuckle and onto the anchor shaft below the turnbuckle, thus making the turnbuckle redundant. The come-along is then tightened until the entire load is taken off of the turnbuckle. At this point, the dynamometer (load cell) carries the entire guy load to the anchor, and the guy tension may be read directly off of the dynamometer dial. To set the correct tension, the come-along is adjusted until the proper tension is read on the dynamometer. Two control points are marked, one above the clamping point on the guy and one on the anchor shaft, and the control length is measured. The dynamometer and the come-along are removed, and the original turnbuckle is adjusted to maintain the control length previously measured. This method is generally considered to be the most accurate.

The indirect measurement method using the pulse or swing (vibration) technique assumes that the guy wire behaves like a string (its period of vibration changes with a change in tension). The pulse or swing technique involves imparting a pulse to the wire and then measuring the time it takes for the pulse to travel several times up and down the wire. The swing technique involves pushing and pulling perpendicular to the wire to set it swaying like a pendulum. The average time of travel per oscillation, or per swing, can then be converted to tension in the wire using an equation that factors in: the average guy wire tension, mass of the cable, chord length, number of complete vibrations or swings, and time in seconds measured while counting the vibrations or swings.

The indirect measurement method using the tangent intercept or sag technique assumes that the guy wire is suspended as a parabola and that its weight is uniformly distributed along the chord. A line of sight is established that is tangential to the guy wire near the anchor end that intersects the tower leg a distance below the guy wire attachment on the mast. This tangent intercept distance is either measured or estimated, and the tension in the wire using an equation that factors in: the horizontal distance between the tower and anchor, the vertical distance between the anchor and the attachment on the mast, the length of the chord between the anchor and the attachment on the mast, the angle of the line of sight, and the vertical distance between the attachment and where the line of sight intersects the leg of the tower (tangent intercept distance).

When guy wire tension table are not readily available, it may be necessary to calculate the change in guy wire tensions due to the difference between the ambient temperature at the time of measurement and the assumed ambient temperature for setting the initial tension. This is typically carried out using a complicated mathematic formula, or a computer program.

Published standards for steel antenna towers and antenna-supporting structures state that for new structures, the guy wire tensions should be set at +15% and -5% of the specified initial tension at anchorage, corrected for the ambient temperature. For existing structures, where constructional stretch of the cables has occurred, the tolerance should be +/-10%. Measurements shall be made at a time when the wind velocity is less than 25 km/h at ground level and there is no ice on the cables.

There are several patents directed toward apparatus for measuring tension in guy wires. Davies, U.S. Pat. No. 2,376,037 discloses an apparatus for measuring and adjusting tension in guy lines that are connected to an embedded anchor bar through a series of links and a turnbuckle. The device has a first yoke in the form of a pair of parallel plates that is detachably secured to the upper end of the cable socket above the turnbuckle and a similar second yoke that is detachably secured to a lowermost one of the links by a pin extending through a second hole provided in the link. Alternatively, the first yoke is detachably secured to the lower eye bolt of the turnbuckle by a pin connecting the turnbuckle to the uppermost link. The outer ends at one side of the yokes are connected by a threaded rod with yoke-engaging nuts or by a turnbuckle, and the opposite outer ends are connected by a pair of threaded rods or a pair of shackles having a dynamometer interposed therebetween. The nuts are tightened to decrease the distance between the yokes such that the links are relieved of tension and allowed to slacken, and the tension is transferred to the yokes and indicated by the dynamometer. Shortening of the guy line is accomplished by adjusting the guy line turnbuckle and/or by replacing one of the links with a shorter link.

Grade et al, U.S. Pat. No. 4,423,639 discloses an apparatus for adjusting and indicating the tension in a guy line system of an inclined oilwell derrick. The tension indicator includes a hydraulic compression load cell, a pair of interlocking U-shaped yokes housing the load cell between the bases of the U-shaped portions, a plunger connected to the load cell bearing against the base of one interlocking yoke, the load cell bearing against the base of the other interlocking yoke, a walking load binder mounted on the outer end of a first interlocking yoke and providing an initial tension load to the guy line system, a threaded nut and screw adjustment assembly affixed to the outer end of a second interlocking yoke and providing a finer adjustment of the tension provided by the walking load binder, a pair of attachment hooks rotatably mounted on the outer ends of the tension indicator device for inserting the tension indicator device between a set of intermediate chains connected in a guy line, and a calibrated pressure gauge directly attached to the load cell. The interlocking yokes transfer a linear tension load in the guy line into a compressive in the load cell and the compressive force is transmitted as a pressure signal to the pressure gauge.

Burbank, Jr., U.S. Pat. No. 4,534,228 discloses a wireline tension gage for mounting upon a wireline between its load and free ends. The tension gage has a body with a central post to engage the wireline in a saddle mount and connected with a transmitter which produces a pneumatic signal indicative of wireline forces acting on the post. Rollers at each end of the body engage and laterally displace at certain angles the wireline to each side of the post. The rollers are mounted on eccentric pivots whereby the rollers can be moved to release or engage the wireline over predetermined distances. Swinging bridge roller mounts allow the body to be placed with the post against the wireline, and then, locked to it in operative position. An adjustment calibrates the transmitter to zero line tension conditions for using the tension gage as an accurate weight indicator.

There are also several well know commercially available devices commonly called "tensionmeters" that are used for measuring tension in a cable. For example, Penn-Tech International, of West Chester, Pa., markets a cable tensionmeter instrument that is suspended on the cable with hooks and measures cable tension by reading deflection of the cable. There are 11 different models for cables with diameters between 3/16" and 1", and calibration charts are plotted specifically for each unit.

Checkline Europe, of Enschede, Netherlands, markets a digital cable tensionmeter instrument that is placed on the cable under a predefined angle. The force used to generate the angle is then used to determine the tension in the cable. The gauge processor of the tensionmeter is calibrated for each cable that is measured and directly displays the tension value. The reference calibrations values are memorized in the processor memory per cable model.

The present invention is distinguished over the prior art in general, and these patents in particular by an apparatus for measuring tension in guy wires, line or cable systems wherein the lower end of the guy wire has a thimble adjoined by a connection pin or clevis pin to a yoke or clevis of a turnbuckle shackle bolt connected to an earth anchor. The apparatus has a generally rectangular lower block assembly that is removably received beneath the yoke or clevis and a generally rectangular upper jaw assembly that is removably received on the guy wire above the clevis, which has an internal thimble-engaging member. One end of the lower block assembly and upper jaw assembly are connected by an elongate threaded rod, and their opposed end is connected by a threaded rod assembly that includes a tension sensor connected with an indicator device. Nuts installed on the lower ends of the threaded rod and threaded rod assembly beneath the lower block assembly are rotated to draw the jaw assembly downward to engage the internal thimble-engaging member on the upper ends of the thimble and move it downward such that the tension on the clevis pin is relieved and the tension is transferred to the threaded rod and threaded rod assembly and sensed by the tension sensor and indicated by the indicator device.

SUMMARY OF THE INVENTION

It is therefore an object of the present invention to provide an apparatus and method for determining the tension in a guy wire, line or cable, which is simple and easily implemented.

It is another object of this invention to provide an apparatus and method for determining the tension in a guy wire, line or cable, which provides greater accuracy and measurement repeatability than present apparatus and methods.

Another object of this invention is to provide an apparatus and method for determining the tension in a guy wire, line or cable, which dos not require knowledge of the type of cable, its original or current mechanical condition, or whether there is ice on the cable.

Another object of this invention is to provide an apparatus and method for determining the tension in a guy wire, line or cable, and which may also be used to adjust the force in the cable to the designed value.

A further object of this invention is to provide an apparatus and method for determining the tension in a guy wire, line or cable, which is portable, easily transported, and easily installed for making tension measurements in the field.

A still further object of this invention is to provide an apparatus for determining the tension in a guy wire, line or cable, which is simple in construction, inexpensive to manufacture, and rugged and reliable in operation.

Other objects of the invention will become apparent from time to time throughout the specification and claims as hereinafter related.

The above noted objects and other objects of the invention are accomplished by the present apparatus for measuring tension in guy wires, line or cable systems wherein the lower end of the guy wire has a thimble adjoined by a connection pin or clevis pin to a yoke or clevis of a turnbuckle shackle bolt connected to an earth anchor. The apparatus has a generally rectangular lower block assembly that is removably received beneath the yoke or clevis and a generally rectangular upper jaw assembly that is removably received on the guy wire above the clevis, which has an internal thimble-engaging member. One end of the lower block assembly and upper jaw assembly are connected by an elongate threaded rod, and their opposed end is connected by a threaded rod assembly that includes a tension sensor connected with an indicator device. Nuts installed on the lower ends of the threaded rod and threaded rod assembly beneath the lower block assembly are rotated to draw the jaw assembly downward to engage the internal thimble-engaging member on the upper ends of the thimble and move it downward such that the tension on the clevis pin is relieved and the tension is transferred to the threaded rod and threaded rod assembly and sensed by the tension sensor and indicated by the indicator device.

DESCRIPTION OF THE PREFERRED EMBODIMENT

Figure 1:
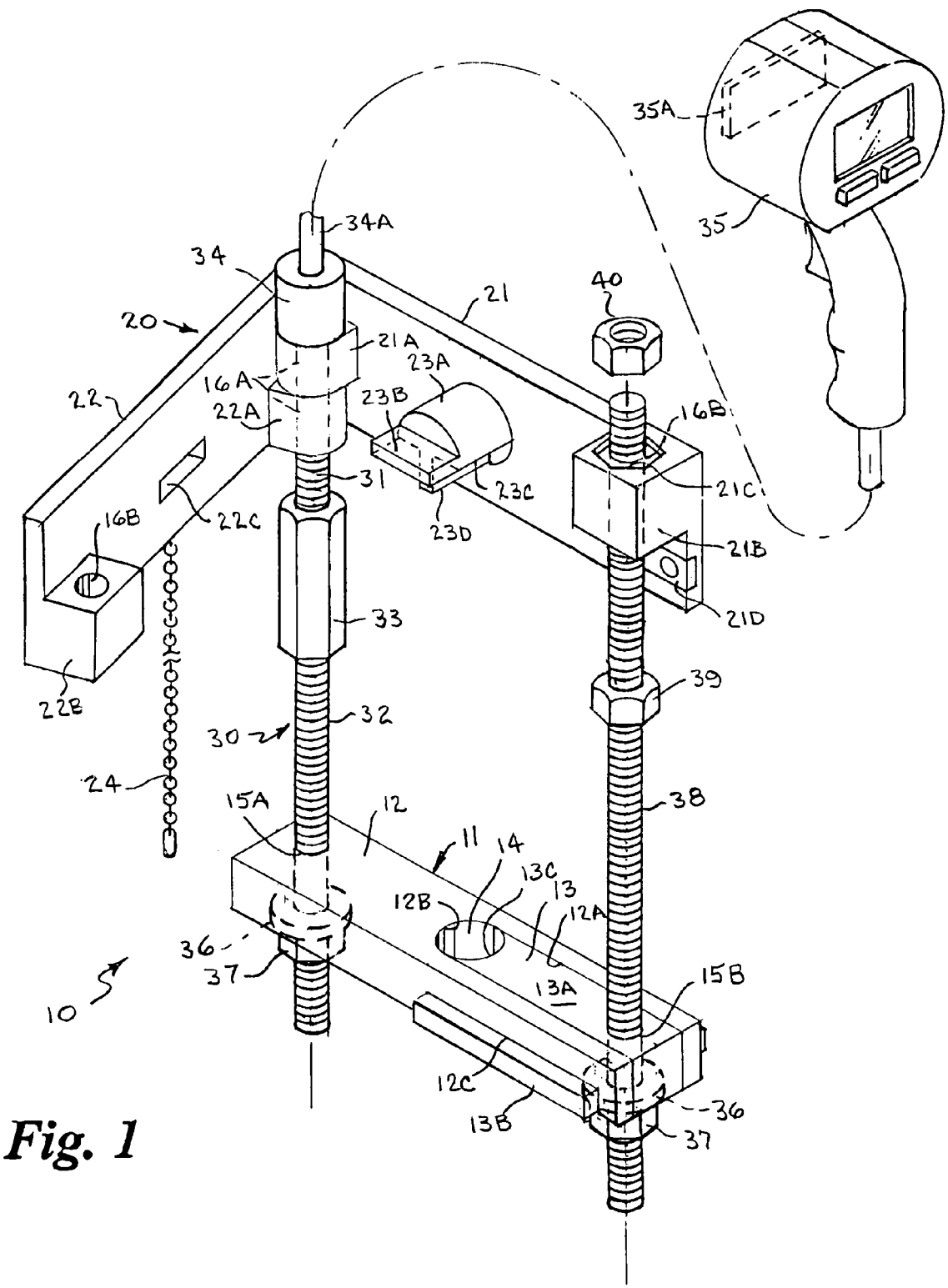
FIG. 1 is an isometric view of the components of the apparatus for measuring tension in a guy wire in accordance with the present invention, shown in an assembled condition.
Figure 2A:
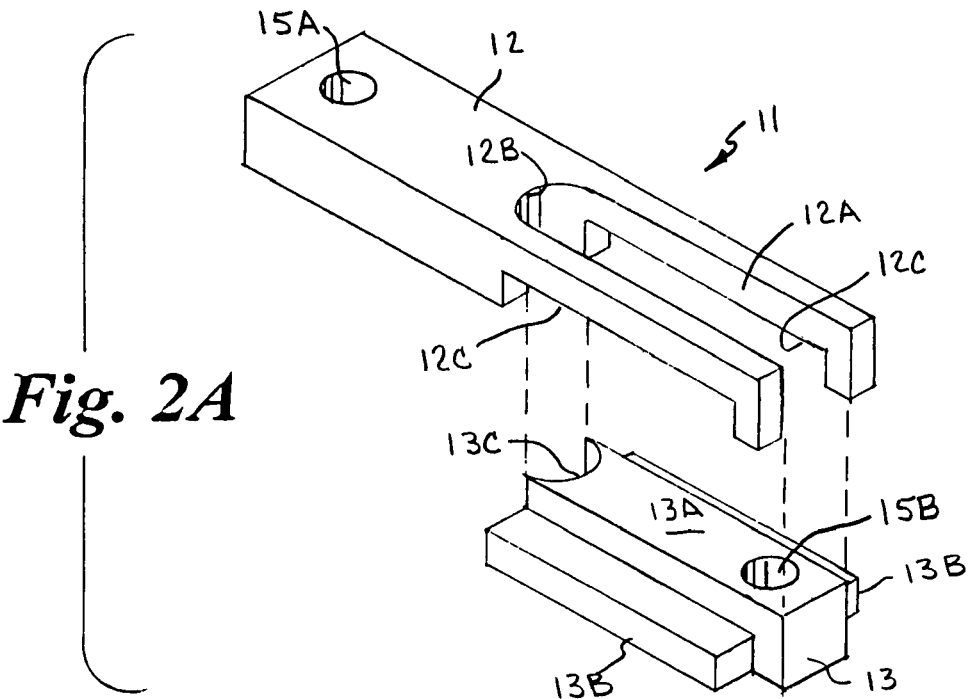
FIGS. 2A and 2B are isometric views of the lower segmented block member of the apparatus in the unassembled condition and assembled condition, respectively.
Figure 2B:
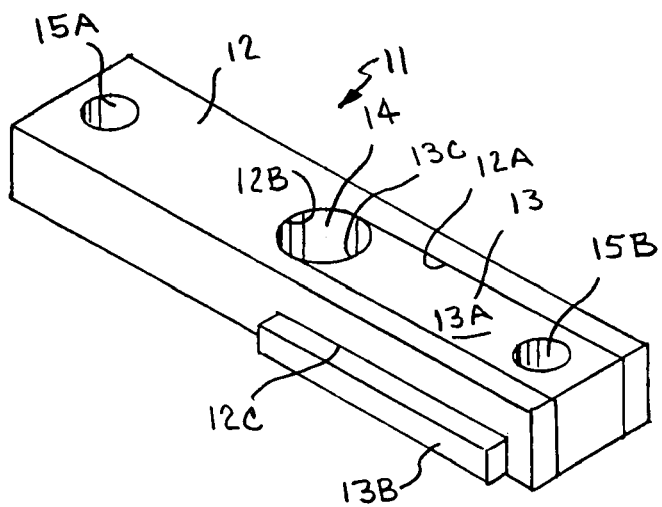

The present tension measuring apparatus is adapted to be installed on guy wire, line or cable systems of the type wherein the lower end of the guy wire is connected by a turnbuckle to an anchor rod or member anchored in the earth, or an equalizer plate connected to the anchor; the lower end of the guy wire having a thimble adjoined by a connection pin to the yoke the turnbuckle shackle bolt.

Referring to the drawings by numerals of reference, there is shown in FIGS. 1, 2A, 2B, 3A and 3B, the components of a preferred apparatus 10 for measuring tension in a guy wire. The apparatus 10 includes a lower segmented rectangular block 11 and an upper generally rectangular jaw assembly 20. The lower segmented block 11 is formed by two separable segments 12 and 13.

Segment 12 is a generally rectangular fork-like member having a wide longitudinal slot 12A extending inwardly from one end terminating in a semicircular curved portion 12B. The lower portion of the opposed side walls at each side of the slot are cut away to define opposed recesses 12C.

Segment 13 is a generally rectangular member having a rectangular upper portion 13A and a wider bottom portion defining laterally opposed flanges 13B extending laterally outward from opposed sides at the lower portion thereof. The rectangular upper portion 13A of segment 13 is slidably received in the slot 12A of the fork-like segment 12 with its flanges 13B engaged in the recesses 12C of the side walls of segment 12.

One end of segment 13 is provided with a vertical semicircular recess 13C, which adjoins the semicircular portion 12B of the slot 12A in the fork-like segment 12, to form a central hole 14 when the segments are assembled. The central hole 14 is sized to encircle the shackle bolt of the turnbuckle just beneath its yoke or clevis, as described hereinafter. Smaller holes 15A and 15B extend vertically through each of the segments 12 and 13, near their outer ends, respectively.

Figure 3A:
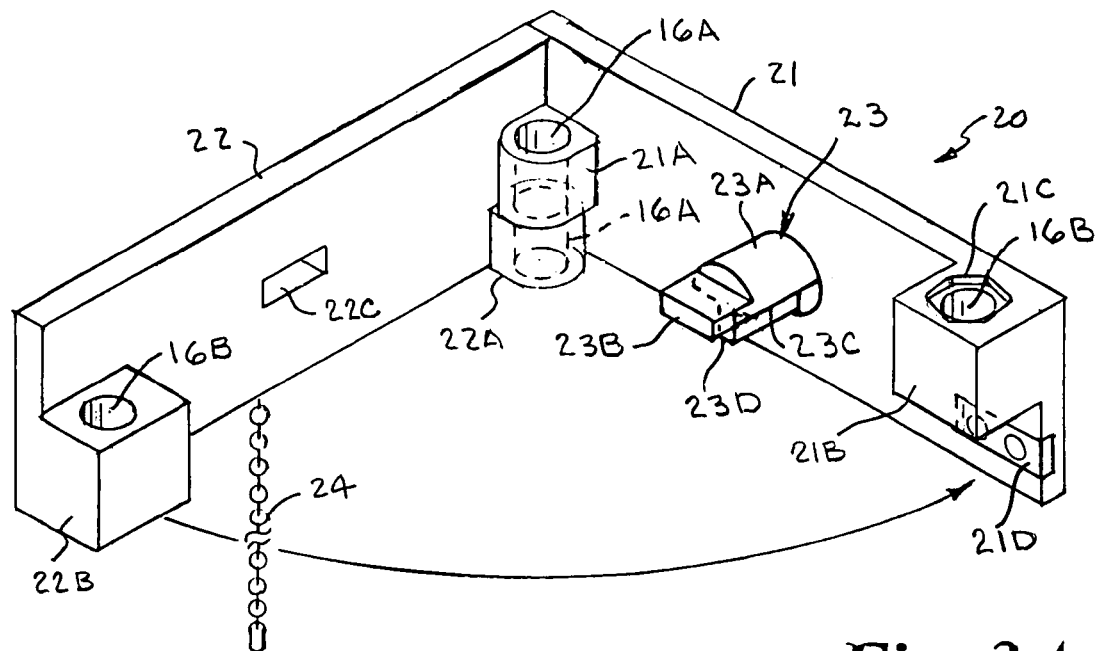
FIGS. 3A and 3B are isometric views of the upper jaw member of the apparatus in the unassembled condition and assembled condition, respectively.
Figure 3B:
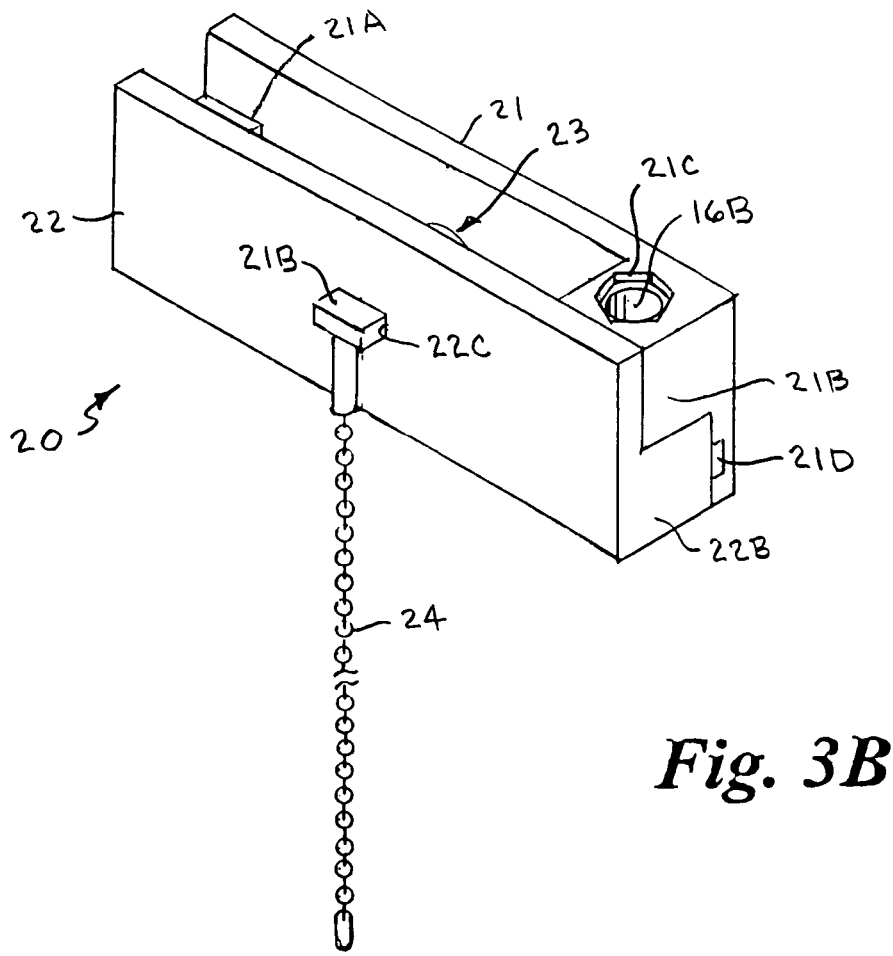

As best seen in FIGS. 3A and 3B, the upper jaw assembly 20 is formed by two separable elongate generally rectangular jaw segments 21 and 22 which are hingedly connected to pivot relative to one another between an open position and a parallel spaced face-to-face closed position. The inner facing surface of one outer end of one jaw segment 21 is provided with an outwardly extending semicircular ear 21A, and the inner facing surface of the opposed jaw segment 22 is provided with an outwardly extending semicircular ear 22A which is slidably and rotatably received beneath the ear 21A of the segment 21. A hole 16A extends vertically through each of the ears 21A and 22A of the jaw segments 21 and 22, respectively, to become axially aligned when the ears are interconnected to form a hinged connection, as described hereinafter.

A generally rectangular upper block 21B extends outwardly a distance from the inner facing surface at the end of the jaw segment 21 opposite the end having the ear 21A. A generally rectangular lower block 22B extends outwardly a distance from the inner facing surface at the end of the other jaw segment 22 opposite the end having the ear 22A. A hole 16B extends vertically through the upper block 21B and lower block 22B, respectively. The lower block 22B is slidably received beneath the upper block 21B of the jaw segment 21 and the holes 16B are axially aligned when the jaw segments are closed. The hole 16B in the upper block 21B is surrounded by a hexagonal recess 21C configured to receive the flats of a hexagonal nut and prevent rotation thereof. A generally rectangular magnetic member 21D or strip containing magnets may be secured substantially flush in a recess in the inner facing surface of the jaw segment 21 beneath the upper block 21B, which will contact the lower block 22B the jaw segments 21 and 22 are closed and hold them together during installation (described hereinafter).

The inner facing surface of the jaw segment 22 is provided with a generally rectangular recess or slot 22C, and a thimble-engaging pin 23 extends horizontally outwardly from the inner surface of the jaw segment 21 intermediate the ends thereof. The pin 23 has a cylindrical rear portion 23A, a generally rectangular front tongue portion 23B, a flat mid section or underside 23C, and a vertical leg portion 23D. The tongue portion 23B extends a distance beyond the vertical leg and is received in the rectangular recess or slot 22C when the jaw segments 21 and 22 are closed. A length of small ball chain 24 is secured at one end to the outer facing side of the jaw segment 22 and its free end extends downwardly from the bottom center of the jaw segment.

As seen in FIG. 1, a threaded rod assembly 30 is installed through the holes 16A in the ears 21A and 22A of the upper jaw assembly 20 and the hole 15A in the lower segmented rectangular block assembly 11. The threaded rod assembly 30 is made up of an externally threaded tension sensor 31 which is received through the axially aligned holes 16A in the ears 21A and 22A of the segments 21 and 22 of the upper jaw assembly 20, and an externally threaded lower rod 32 connected at the lower end thereof in axial alignment therewith by an elongated hexagonal nut 33. A strain gauge or load cell is contained in the interior of the tension sensor 31. It should be understood that the externally threaded tension sensor 31 and the threaded lower rod 32 may be of different diameters and formed of different materials.

Suitable externally threaded tension sensors, strain studs, and cap screws, containing a strain gauge suitable for use are commercially available from Strainsert Co., of West Conshohocken, Pa., and are described in U.S. Pat. No. 2,873,341, which is hereby incorporated herein by reference.

An electrical connector 34 connected with the electrical leads of the interior strain gauge or load cell is threadedly engaged on the upper end of the tension sensor member 31. The bottom surface of the connector 34 is received on the top surface of the ear 21A of the jaw segment 21, and a cable 34A extends from its top end, which is connected with a commercially available indicator device 35 (described hereinafter).

The lower threaded rod 32 is received through the hole 15A in the fork-like segment 12 of the lower segmented block 11, and a thrust bearing 36 and a nut 37 are installed on the lower end portion of thereof to reside against the bottom surface of the segment 12.

An elongate externally threaded rod 38 is installed through the second hole 15B in the segment 13 of the lower segmented rectangular block assembly 11 and is of sufficient length such that its upper end extends through the second holes 16B in the upper and lower blocks 21B and 22B of the jaw segments 21 and 22, and a thrust bearing 36 and a nut 37 are installed on its lower end portion to reside against the bottom surface of the segment 13.

An intermediate nut 39 may be installed on the threaded rod 38 a distance below its top end to facilitate handling and aligning the upper end of the rod when installing it through the holes 16B in the upper and lower blocks 21B and 22B. After the threaded rod 38 has been installed, its upper end extends a distance above the top surface of the upper block 21B of the jaw segment 21 and a nut 40 is installed on the upper end portion of the rod and is captured in the hexagonal recess 21C in the top of the upper block when the rod is tightened (as described hereinafter) to prevent rotation of the nut.

As stated above, the electrical leads of the interior strain gauge or load cell of the tension sensor member 31 are connected via cable 34A to commercially available indicator device 35. A preferred indicator device 35 suitable for use is commercially available from Romell, Inc., a Canadian company, of Verdun, Quebec, Canada. Such an indicator has a one-button (on/off) microprocessor controlled digital display with a continuous readout, a load range of up to 20,000 lbs or 9,000 daN, is highly accurate, and operates on 9V batteries.

As described hereinafter, in operation, the strain gauge or load cell of the tension sensor member 31 measures the tension and delivers a signal to the indicator 35. The indicator 35 processes this signal through a signal conditioner circuit board which delivers +/−5V regulated voltage for the strain gauge or load cell, applies a known gain to the signal and zeroes the signal before the measurement starts. The indicator 35 has also build-in analog to digital converter, a liniarizer for the signal, and a scale adaptor (for lbs or daN or N).

The back side of the indicator device 35 may also be provided with a strip of magnetic material 35A so that it may be easily attached to the upper jaw assembly 20 or lower block assembly 11 at a convenient location for taking a reading and eliminate the need for holding it by hand.

Having described the components of the present invention, the following is a description of how the apparatus in placed onto the guy wire for measuring tension.

Operation

Figure 4:
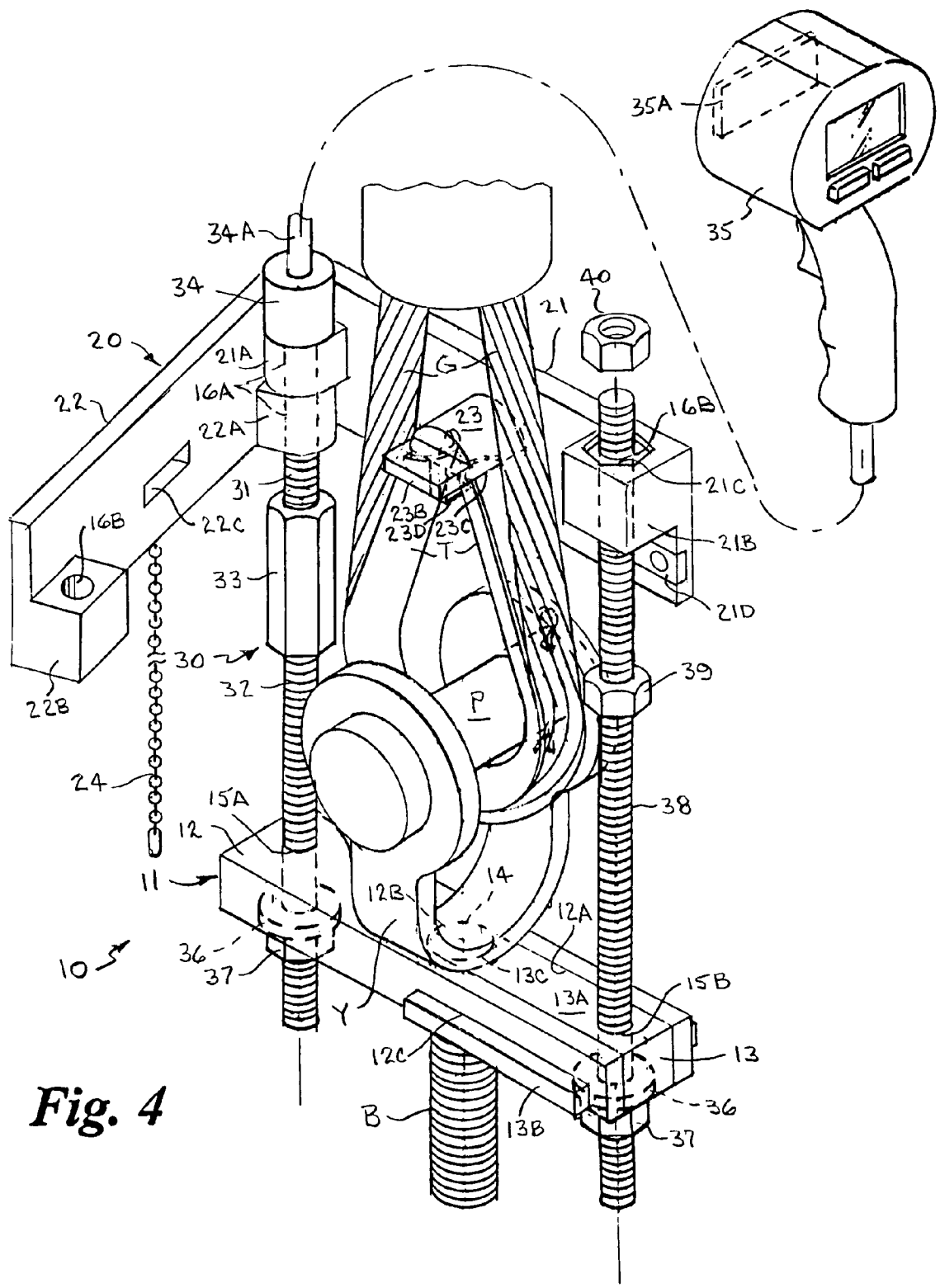
FIGS. 4 and 5 are isometric views showing the apparatus installed on the lower end of a guy wire and yoke or clevis of a turnbuckle shackle bolt, with the upper jaw member in an open position, and in a closed position, respectively.
Figure 5:
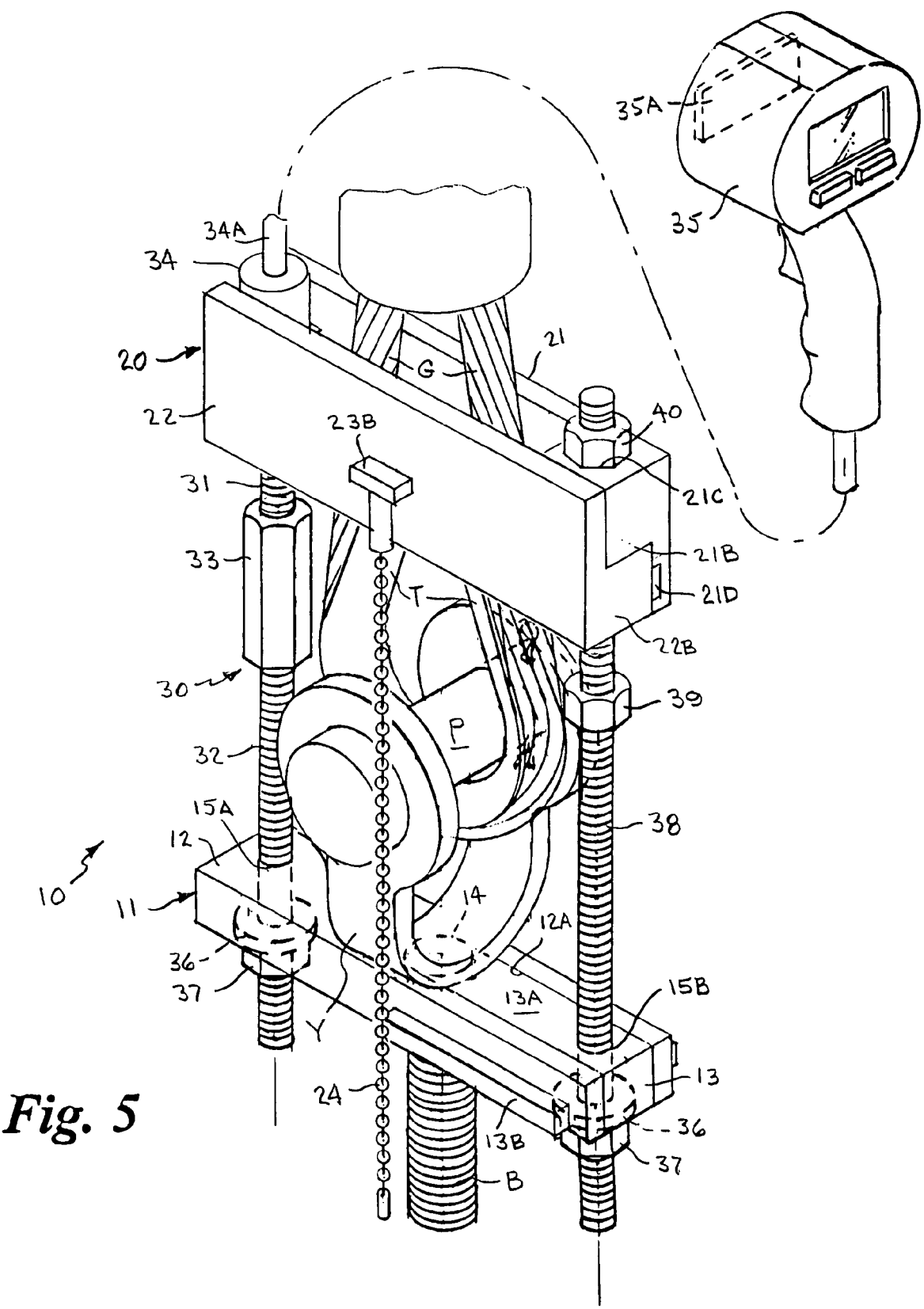
Figure 6:
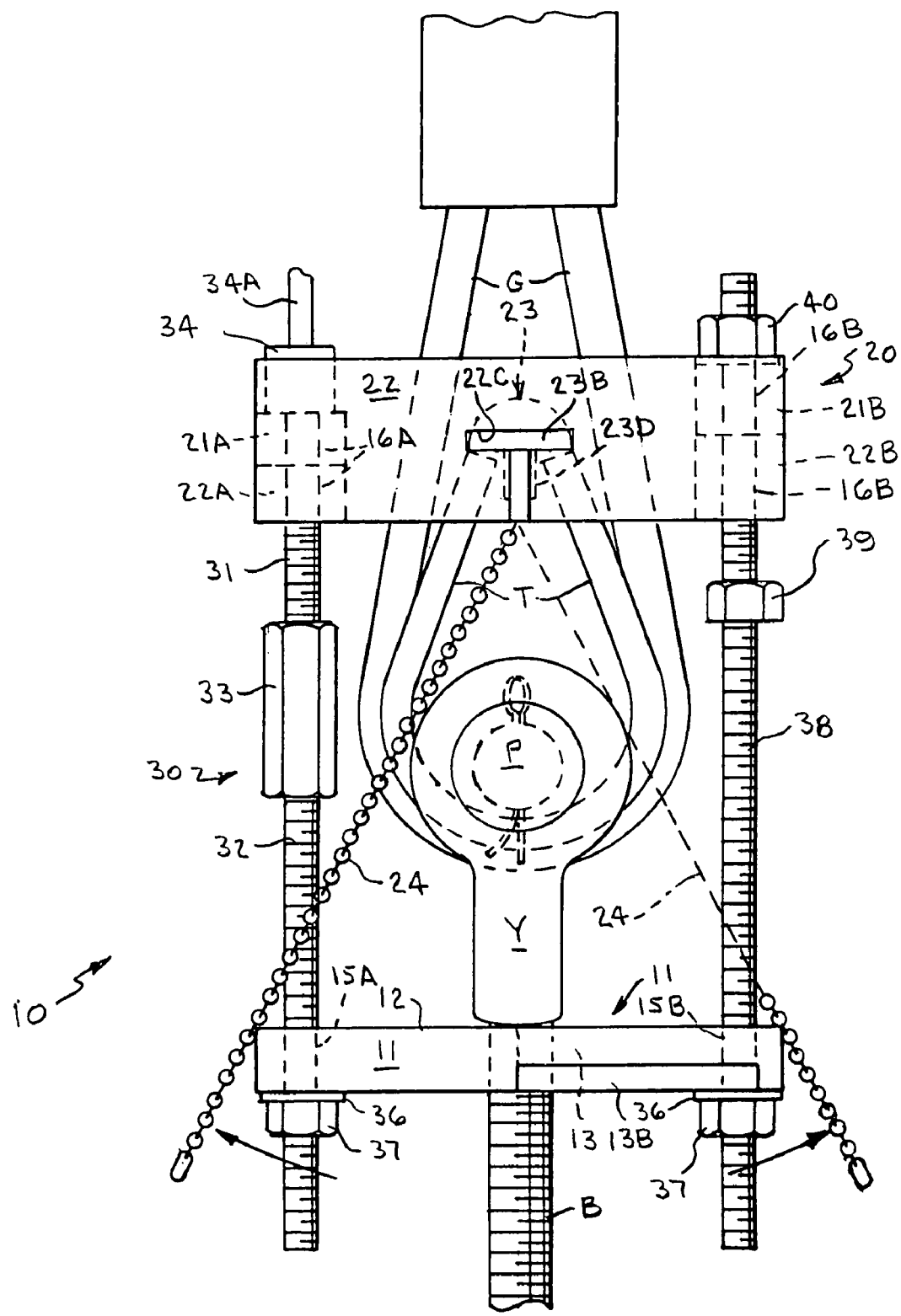
FIG. 6 is an elevation view of the apparatus installed on the lower end of a guy wire and yoke or clevis of a turnbuckle shackle bolt with the tension load in the guy line transferred to the apparatus.

Referring now to FIGS. 4, 5 and 6, a typical guy wire connection is shown, wherein the lower end of the guy wire G is secured around a thimble T connected by a connection pin or clevis pin P to a yoke or clevis Y of a turnbuckle shackle bolt B, which is connected to an earth anchor, such as an anchor rod or member anchored in the earth, or an equalizer plate connected to the anchor. The anchoring members are conventional in the art and therefore not shown.

The apparatus 10 is partially assembled with the lower rod 32 of the threaded rod assembly 30 extending through the hole 15A in the fork-like segment 12 of the lower segmented rectangular block assembly 11, the thrust bearing 36 and nut 37 installed on the lower rod and disposed beneath the segment 12, the tension sensor member 31 extending through the holes 16A in the ears 21A, 22A of the segments 21 and 22 of the upper jaw assembly 20, and the electrical connector 34 engaged on the upper end of the tension sensor member with its bottom surface disposed on the top surface of the ear 21A of the jaw segment 21.

The other segment 13 of the lower block assembly 11 is also partially assembled with the lower end of the elongate threaded rod 38 extending through the hole 15B in the segment 13 and the thrust bearing 37 and nut 38 installed on its lower end disposed beneath the segment 13, and the intermediate nut 39 installed a distance below its top end.

Holding the upper jaw assembly 20 and the fork-like segment in a vertically spaced relation, the partially assembled apparatus 10 is then moved laterally onto the guy wire connection such that the slot 12A of the fork-like segment 12 of the lower segmented rectangular block assembly 11 straddles the shank of the turnbuckle bolt B with the shank disposed adjacent to the semicircular curved portion 12B of the slot and the top of segment 12 disposed beneath the yoke or clevis Y. In this position, the jaw segments 21 and 22 are partially open in a generally V-shaped configuration above the thimble T and the flat underside 23C of the thimble-engaging pin 23 is disposed above the upper ends of the thimble, and its vertical leg portion is disposed between the upper ends of the thimble, as shown in FIG. 4.

The jaws 21 and 22 are then closed such that the lower block 22B is received beneath the upper block 21B and the holes 16B in the blocks are aligned, and the rectangular recess or slot 22C is received on the outer end of the tongue portion 23B of the pin 23. The magnetic member 21D beneath the upper block 21B will contact the lower block 22B the jaw segments 21 and 22 and hold them closed, as seen in FIG. 5.

The other segment 13 of the lower block assembly 11 is positioned beneath the fork-like segment 12, moved laterally onto the shank of the turnbuckle bolt B with its semicircular curved end portion 13C adjacent to the shank, and is then raised vertically such that its rectangular upper portion 13A is received in the slot 12A of the fork-like segment 12 with its flanges 13B engaged in the recesses 12C of the side walls of segment 12. In this position, the segments 12 and 13 are disposed beneath the yoke Y and their curved portions 12B and 13C form a circular hole 14 that surrounds the shank of the turnbuckle bolt B.

The elongate threaded rod 38 is raised vertically such that the thrust bearing 37 and nut 38 installed on its lower end are disposed on the bottom of the segment 13 and its upper end extends through the holes 16B in the upper and lower blocks 21B and 22B of jaw the segments 21 and 22. The intermediate nut 39 disposed beneath the jaw assembly 20 may be gripped to facilitate holding, handling and aligning the upper end of the rod 38 when installing it through the holes 16B in the upper and lower blocks 21B and 22B. A nut 40 is then installed on the upper portion of the threaded rod 38 and rotated a distance downward thereon such that when the rod is released, it will be captured in the hexagonal recess 21C of the upper block 21B to prevent it from rotating. The indicator device 35 is then connected via cable 34A to the tension sensor member 31.

As shown in FIGS. 5 and 6, the nuts 37 at the lower ends of the threaded rod 38 and threaded rod assembly 30 beneath the lower block assembly 11 are rotated by a socket wrench or other suitable tool to draw the closed jaw assembly 20 downward and engage the internal tongue 23 on the upper ends of the thimble T and move the thimble downward relative to the connection pin or clevis pin P such that the tension on the pin is relieved and the tension is transferred to the threaded rod 38 and threaded rod assembly 30. This can be determined by manually rotating the connection pin or clevis pin P. If it rotates freely, the tension has been transferred. The tongue 23 connects the jaw segments 21 and 22 whereby the force is equally shared by the jaw segments and the threaded rod assembly 30 and rod 38, when loaded.

Prior to taking a reading, the chain 24, which extends downwardly from the bottom center of the jaw segment 22, is grasped at its free end and the chain is positioned angularly and placed first at one top corner of the lower block assembly 11, and then the opposed top corner. The nuts 37 may be rotated as necessary such that the distance along the chain where it intersects the respective corners is the same on both sides. This step insures that the lower block assembly 11 and the jaw assembly 20 are substantially parallel with each other.

After it has been determined that the lower block assembly 11 and the jaw assembly 20 are substantially parallel, a measurement reading is taken with the indicator device 35. The interior strain gauge or load cell of the tension sensor member 31 measures the tension and delivers a signal to the indicator 35, which then processes the signal and displays the measured tension as units of force representing the strain or tension to which the apparatus is subjected.

The apparatus 10 may also be used for adjusting the guy wire to the proper design tension. This is accomplished by installing the apparatus and transferring the tension, and taking a measurement reading, as described above, and rotating the existing turnbuckle connected with the shackle bolt B until the indicator device 35 displays the prescribed design tension value.

While this invention has been described fully and completely with special emphasis upon preferred embodiments, it should be understood that within the scope of the appended claims the invention may be practiced otherwise than as specifically described herein.

The invention claimed is:

1. Apparatus for measuring the tension in a guy line having a lower end secured to a thimble adjoined by a connection pin to a yoke or clevis of a shackle bolt connected with an earth anchor, the apparatus comprising:
    a generally rectangular lower member having opposed ends and adapted to be removably installed on the shackle bolt beneath the yoke or clevis;
    a generally rectangular upper member having opposed ends and adapted to be removably installed on the guy line above said thimble including thimble engagement means for engaging said thimble;
    a first threaded rod assembly having an upper end releasably connected adjacent to one end of said upper member and a lower end extending through said lower member adjacent to a corresponding end thereof and projecting beyond said lower member, and an adjustment nut threadedly engaged on its said projecting end;
    a second threaded rod having an upper end releasably connected adjacent to an opposite end of said upper member and a lower end extending through said lower member adjacent to a corresponding opposite end thereof and projecting beyond said lower member, and an adjustment nut threadedly engaged on its said projecting end;
    strain gauge means in said first threaded rod assembly for producing an output tension signal; and
    a tension indicator connected with said strain gauge means;
    said adjusting nuts being rotated to draw said upper member downward to engage said thimble engagement means on the thimble and move it downward such that tension on the connection pin is relieved and the tension is transferred to said threaded rod and threaded rod assembly and sensed by said strain gauge means and displayed by the indicator device as units of force representing the strain or tension to which said apparatus is subjected.

2. The apparatus according to claim 1, wherein
said first threaded rod assembly comprises a first threaded rod and a second threaded sensor rod adjoined thereto in axial alignment, said sensor rod having a central bore and said strain gauge means is disposed in said central bore.

3. The apparatus according to claim 1, further comprising:
a thrust bearing installed on said first threaded rod assembly projecting end and said second threaded rod projecting end, respectively, disposed between a bottom surface of said lower member and each adjustment nut.

4. The apparatus according to claim 1, further comprising:
measuring means extendable between a point on said upper member and each of said lower member opposed ends for determining the parallel relationship between said upper member and said lower member.

5. The apparatus according to claim 4, wherein
said measuring means comprises a flexible member secured at one end to an outer facing side of said upper member and having a free end extending downwardly from the bottom center thereof.

6. The apparatus according to claim 1, wherein
said generally rectangular lower member comprises a segmented assembly having a first segment with a semicircular curved portion and a second segment having an opposed semicircular curved portion which are assembled together such that said semicircular curved portions form a central hole that encircles the shackle bolt just beneath its yoke or clevis when said segments are installed thereon.

7. The apparatus according to claim 6, wherein
said lower member first segment is a generally rectangular member having a wide longitudinal slot extending inwardly a distance from one said end terminating in a semicircular curved portion, and opposed side walls at each side of said slot with lower portions cut away to define opposed recesses; and
said lower member second segment is a generally rectangular member having laterally opposed flanges extending laterally outward from opposed sides at a lower portion thereof, the second segment slidably received in said slot of said fork-like first segment with its said flanges engaged in said recesses, and having a vertical semicircular recess at one end which adjoins said semicircular portion of said slot to form a central hole that encircles the shackle bolt just beneath its yoke when said segments are installed thereon.

8. The apparatus according to claim 6, wherein
said lower member first segment has a hole extending therethrough through which a lower end of said first threaded rod assembly extends; and
said lower member second segment has a hole extending therethrough through which a lower end of said second threaded rod extends.

9. The apparatus according to claim 1, wherein
said generally rectangular upper member comprises a jaw assembly having a first jaw segment and a second jaw segment hingedly connected at one end to pivot relative to one another between an open position and a parallel spaced face-to-face closed position; and
said thimble engagement means extends outwardly from an inner facing surface of said first jaw segment and has an outer end engaged with said second jaw segment in the closed position.

10. The apparatus according to claim 9, wherein
said first jaw segment and said second jaw segment each have an ear at said one end, the ears disposed in superposed relation, and each having a hole extending vertically therethrough through which an upper end of said first threaded rod assembly extends; and
said first jaw segment and said second jaw segment pivot relative to one another about the longitudinal axis of said first threaded rod assembly.

11. The apparatus according to claim 10, wherein
said first jaw segment has generally rectangular upper block extending outwardly a distance from an inner facing surface at the end opposite its end having the ear, said second jaw segment has generally rectangular lower block extending outwardly a distance from an inner facing surface at its end opposite the end having the ear, said second block received beneath said upper block when said jaw segments are closed; and
said upper block and said lower block each having a hole extending vertically therethrough through which an upper end of said second threaded rod extends.

12. The apparatus according to claim 11, wherein
said second threaded rod has a nut threadedly engaged on its said upper end to be disposed on the top of said upper block; and
said first jaw segment upper block having a recess in its top surface end surrounding said hole configured to receive and engage the flats of said nut and prevent rotation thereof.

13. The apparatus according to claim 10, wherein
said first threaded rod assembly comprises a first threaded rod and a second threaded sensor rod adjoined thereto in axial alignment, said sensor rod having a central bore and said strain gauge means is disposed in said central bore; and
an electrical connector threadedly engaged on an upper end of said first threaded rod assembly above the uppermost one of said superposed ears, and a cable electrically connected with electrical leads of said strain gauge means extending therefrom for connection with said tension indicator.

14. The apparatus according to claim 1, wherein
said second jaw segment has a recess or slot in an inner facing surface; and
said thimble engagement means has a generally rectangular outer end engaged in said recess or slot in said second jaw segment in the closed position, a flat underside for engaging the top ends of the thimble, and a vertical portion depending therefrom to be received between the upper ends of the thimble.

15. A method for measuring the tension in a guy line having a lower end secured to a thimble adjoined by a connection pin to a yoke or clevis of a shackle bolt connected with an earth anchor, comprising the steps of:
providing an apparatus having a generally rectangular clevis-engaging member and a generally rectangular thimble-engaging member adjustably connected in vertically spaced generally parallel relation by a first threaded rod assembly installed between corresponding ends of said members and a second threaded rod installed between corresponding opposite ends of said members, the lower ends of said threaded rod assembly and said threaded rod extending through said clevis-engaging member, and an adjustment nut threadedly engaged on each of said lower ends, said threaded rod assembly including strain gauge means for producing an output tension signal;
removably mounting said clevis-engaging member on the shackle bolt beneath the yoke or clevis, and said thimble-engaging member on the guy line above the thimble;
connecting said strain gauge means with a tension indicator device; and
rotating said adjusting nuts to draw said thimble-engaging member downward to engage and move the thimble downward such that tension on the connection pin is relieved and the tension is transferred to said threaded rod and threaded rod assembly and sensed by said strain gauge means and displayed by the indicator device as units of force representing the strain or tension to which said apparatus is subjected.

16. A method for adjusting the tension in a guy line having a lower end secured to a thimble adjoined by a connection pin to a yoke or clevis of a turnbuckle shackle bolt connected with an earth anchor, comprising the steps of:
providing an apparatus having a generally rectangular clevis-engaging member and a generally rectangular thimble-engaging member adjustably connected in vertically spaced generally parallel relation by a first threaded rod assembly installed between corresponding ends of said members and a second threaded rod installed between corresponding opposite ends of said members, the lower ends of said threaded rod assembly and said threaded rod extending through said clevis-engaging member, and an adjustment nut threadedly engaged on each of said lower ends, said threaded rod assembly including strain gauge means for producing an output tension signal;
removably mounting said clevis-engaging member on the shackle bolt beneath the yoke or clevis, and said thimble-engaging member on the guy line above the thimble;
connecting said strain gauge means with a tension indicator device;
rotating said adjusting nuts to draw said thimble-engaging member downward to engage and move the thimble downward such that tension on the connection pin is relieved and the tension is transferred to said threaded rod and threaded rod assembly and sensed by said tension sensor and displayed by the indicator device as units of force representing the tension to which said apparatus is subjected; and
rotating the turnbuckle of the turnbuckle shackle bolt as necessary until a prescribed design tension value is displayed by the indicator device.

* * * * *